US011334468B2

(12) United States Patent
Géhberger et al.

(10) Patent No.: US 11,334,468 B2
(45) Date of Patent: May 17, 2022

(54) CHECKING A CORRECT OPERATION OF AN APPLICATION IN A CLOUD ENVIRONMENT

(71) Applicant: Telefonaktiebolaget LM Ericsson (publ), Stockholm (SE)

(72) Inventors: Dániel Géhberger, Montreal (CA); Péter Mátray, Budapest (HU); Gabor Nemeth, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/772,177

(22) PCT Filed: Dec. 14, 2017

(86) PCT No.: PCT/EP2017/082841
§ 371 (c)(1),
(2) Date: Jun. 12, 2020

(87) PCT Pub. No.: WO2019/114970
PCT Pub. Date: Jun. 20, 2019

(65) Prior Publication Data
US 2021/0073106 A1 Mar. 11, 2021

(51) Int. Cl.
*G06F 11/00* (2006.01)
*G06F 11/36* (2006.01)
*G06F 11/07* (2006.01)

(52) U.S. Cl.
CPC ...... *G06F 11/3612* (2013.01); *G06F 11/0709* (2013.01); *G06F 11/0769* (2013.01)

(58) Field of Classification Search
CPC ............ G06F 11/0709; G06F 11/0757; G06F 11/076; G06F 11/0769; G06F 11/3612
See application file for complete search history.

(56) References Cited

U.S. PATENT DOCUMENTS 6,367,029 B1 * 4/2002 Mayhead ............ G06F 11/1625
709/203
9,240,937 B2 1/2016 Katiyar et al.
(Continued)

OTHER PUBLICATIONS

International Search Report and Written Opinion of the International Searching Authority, PCT/EP2017/082841, dated Sep. 25, 2018, 24 pages.
(Continued)

*Primary Examiner* — Elmira Mehrmanesh
(74) *Attorney, Agent, or Firm* — Sage P

(57) ABSTRACT

The method relates to a method for checking a correct operation of an application running in a cloud environment, the method comprising at a health checking entity, monitoring a reception of health reports generated by the application, each health report comprising at least information allowing an operation status of the application to be determined, determining whether an anomaly is detected in the reception of the health reports, wherein, when an anomaly is detected in the reception, triggering a transmission of a new health report to be transmitted by the application, determining whether the application is operating correctly after triggering the transmission of the new health report, wherein, if the application is not operating correctly after triggering the transmission of the new health report, informing a control entity of the application that the application is not operating correctly.

21 Claims, 9 Drawing Sheets

(56) References Cited

U.S. PATENT DOCUMENTS

| | | | |
|---|---|---|---|
| 9,294,343 B2 | 3/2016 | Jain et al. | |
| 9,667,490 B1 | 5/2017 | Emelyanov et al. | |
| 9,712,415 B2* | 7/2017 | Groenendijk | H04L 41/12 |
| 9,852,016 B2* | 12/2017 | Griffith | G06F 11/0757 |
| 2009/0138751 A1* | 5/2009 | Moore | G06F 11/0709 714/4.1 |
| 2009/0252047 A1 | 10/2009 | Coffey et al. | |
| 2009/0300403 A1 | 12/2009 | Little | |
| 2010/0284269 A1* | 11/2010 | Zhu | H04L 45/00 370/221 |
| 2012/0294157 A1* | 11/2012 | Guo | H04L 43/10 370/251 |
| 2013/0283086 A1 | 10/2013 | Bradley et al. | |
| 2014/0032173 A1* | 1/2014 | Kida | G06F 11/0751 702/183 |
| 2015/0032876 A1 | 1/2015 | Staunton-Lambert | |
| 2015/0095720 A1* | 4/2015 | Srivastava | G06F 11/079 714/47.3 |
| 2015/0237121 A1* | 8/2015 | Nigam | H04L 67/2814 709/204 |
| 2018/0123928 A1* | 5/2018 | Moradi | H04L 43/0852 |

OTHER PUBLICATIONS

"Monitoring the Status of Your Instances," Amazon Elastic Compute Cloud, User Guide for Linux Instances, Monitoring the Status of your Instances, accessed Sep. 25, 2017, pp. 378-382.

"Uptime Checks," Stackdriver Monitoring, Google Cloud Platform, https://cloud.google.com/monitoring/alerts/uptime-checks, downloaded from the internet Sep. 25, 2017, 8 pages.

Tom Preston-Werner, "God—A Process Monitoring Framework In Ruby," Google Group: http://groups.google.com/group/god-rb, downloaded from the internet Sep. 25, 2017, 25 pages.

Suraj Gaurav,Suren Machiraju: Hardening Azure Applications, Failure Detection and Recovery (p. 100) (https//books.google.hu/books?id=3lknCgAAQBAJ).

Das, A., et al., "SWIM: Scalable Weakly-consistent Infection-style Process Group Membership Protocol," Proceedings of the IEEE International Conference on Dependable Systems and Networks, Washington, DC, Jun. 23-26, 2002, http://www.cs.cornell.edu/gupta/swim, 10 pages.

Kanso, A., et al., "Can Linux Containers Clustering Solutions Offer High Availability," Published 2016, Computer Science, 6 pages.

* cited by examiner

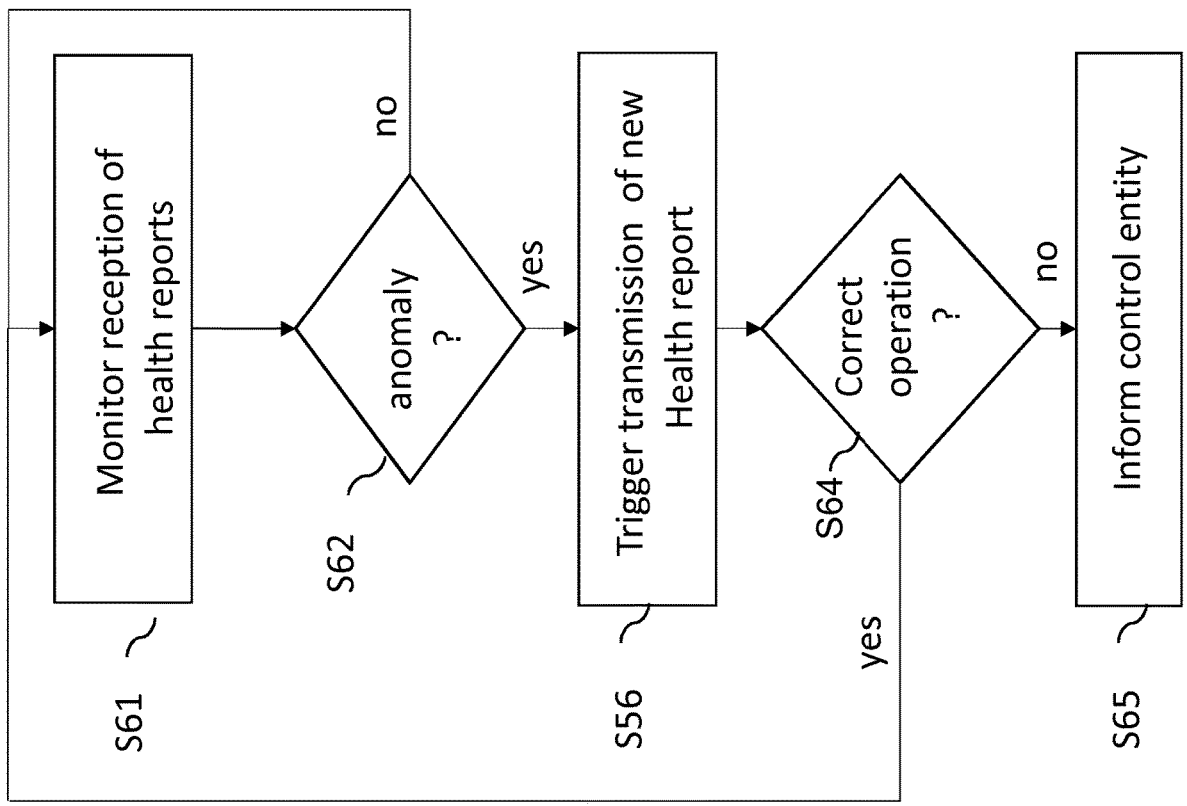

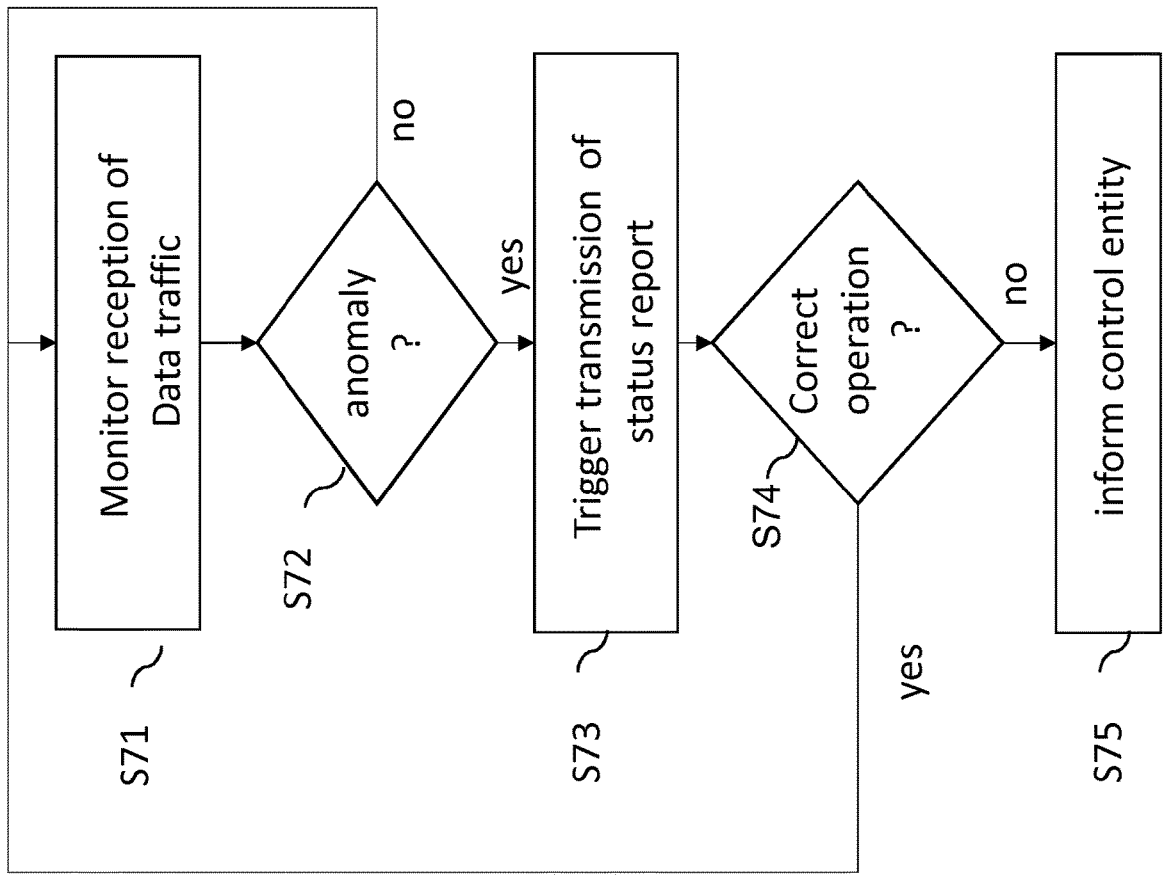

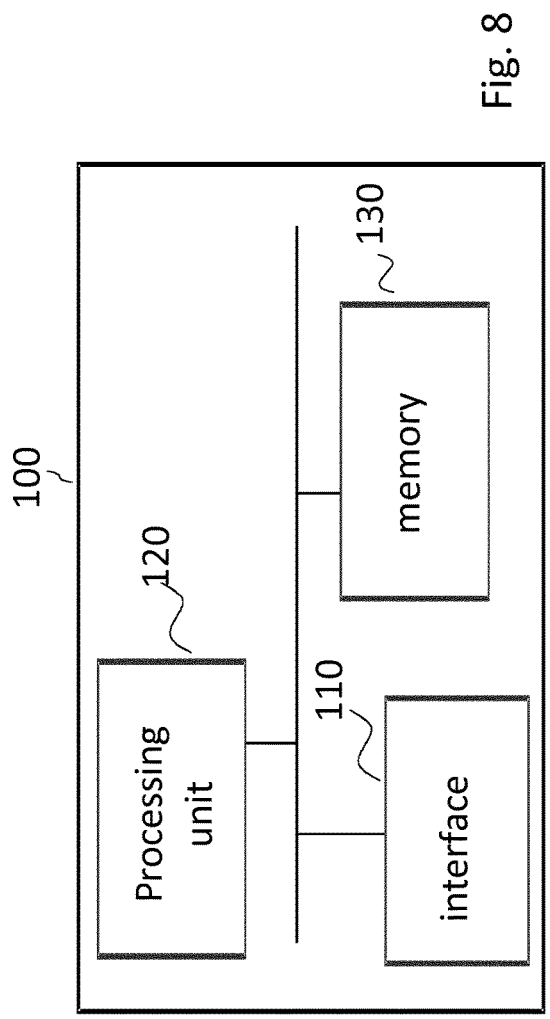
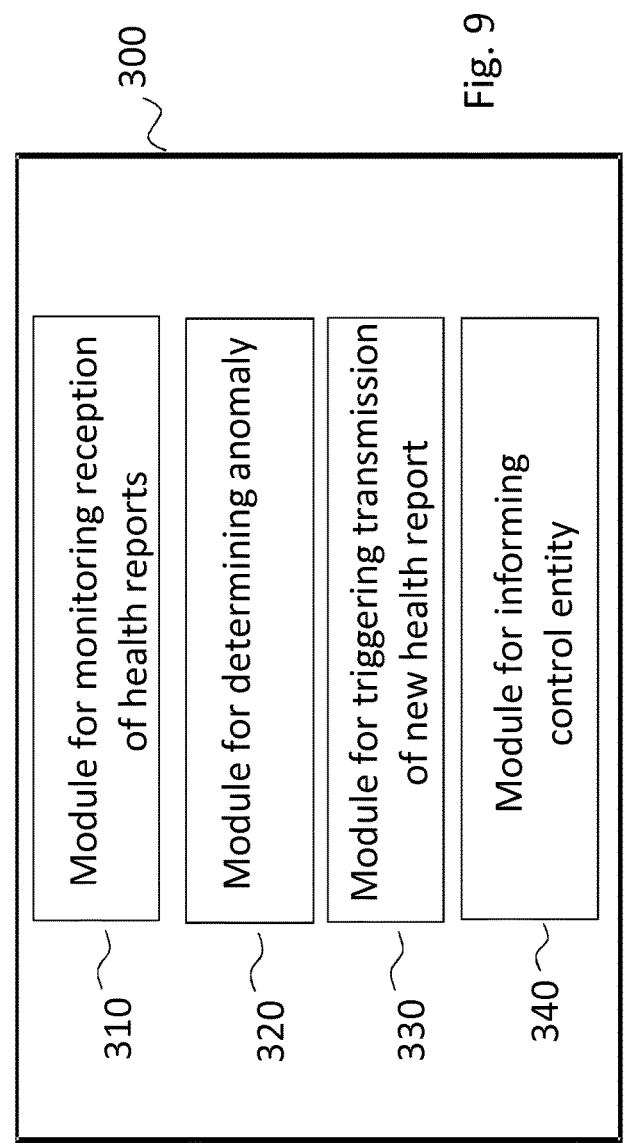

CHECKING A CORRECT OPERATION OF AN APPLICATION IN A CLOUD ENVIRONMENT

CROSS REFERENCE TO RELATED APPLICATIONS

This application is a 35 U.S.C. § 371 national stage application of PCT International Application No. PCT/EP2017/082841 filed on Dec. 14, 2017, the disclosure and content of which is incorporated by reference herein in its entirety.

TECHNICAL FIELD

The application relates to a method for checking a correct operation of an application running in a cloud environment and relates to the corresponding health checking entity carrying out the corresponding method.

Furthermore, a method for checking a correct operation of a first node located in the cloud environment is provided and the corresponding health checking entity which checks the correct operation. Additionally, a computer program comprising program code and a carrier comprising the computer program are provided.

BACKGROUND

Due to the emerging trend of moving telecom and industrial applications into the cloud, systems need to be able to be equipped with proper low latency solutions. Such applications are for example industrial IoT (Internet of Things) systems where tight control loops might be controlling robots by giving commands every 1-10 milliseconds, or data plane nodes in a telecom network. In the first case, the slow detection and recovery of a failure may cause physical damages in the environment. In the telecom case, the fault of a node affects multiple user sessions which are muted immediately, and if the sessions are not reconstructed in 1 or 2 seconds the users tend to hang up.

Existing cloud systems provide monitoring services as inherent components of the environment. These monitoring services work on the minute scale, checking CPU and other resource usage and whether the given application (VM (Virtual Machine), container) is still running. A recent study showed that state of the art container orchestration solutions can detect local container failures in 400 ms and the container can be restarted in 2 seconds, while remote node failures can be detected in 4.6 seconds and recovered in seconds (https://researcher.watson.ibm.com/researcher/files/us-sseelam/Woc2016-KubeHA-Final.pdf).

It is also possible to configure monitoring systems to establish network connections towards the given applications periodically, thus testing if it is functioning correctly, or sending probe data, like e-mails in case of a mail server. Monitoring systems provide some options in case the reports raise an alarm, such as restarting an application instance, sending notifications or executing custom applications. In all the cases the reports are collected centrally and the given reaction is also triggered from there, as a result, at least seconds are needed for the system react.

Existing supervision solutions can periodically check if the supervised process is still running or can subscribe to kernel events thus immediately getting notified if the process crashes. These supervision tools are designed to restart the monitored process when it crashes or execute custom scripts.

The liveness of nodes in a distributed system can be monitored with periodical status message exchange (usually called Keepalive or heartbeat), or gossip protocols. The frequency of the messages determines how fast the system can detect the failure of a node. However, faster detection requires more resources used for the monitoring itself.

An existing solution uses file locks in a distributed storage system to determine the liveness of applications. The applications is considered to be alive until the file is exclusively locked. In case of application failure, the lock is released by underlying kernel mechanisms. The method claimed to be working and noticing faults on the 15 seconds time range.

Fault detection and recovery as a service are described. In the system, monitor nodes watch applications executed locally (for example by examining log messages, the communication between the application and end users, or using a propitiatory status reporting interface). The monitor nodes sent periodical status reports to one or more central monitoring nodes. If an application fails, the central monitoring node instructs the monitor node to restart it. If a monitor node fails, the central monitoring node restarts all the applications on another monitor node.

The liveness of systems can be also monitored with watchdog timers which require to be set to count down from a non-zero value periodically. If the timer expires, it may reset the system or execute other steps such as switching the system to safe mode. Watchdog timers are mostly used in microcontrollers, but they exist to some extent in operating systems as well.

Process crashes can be recognized instantly by local supervision solutions, however, processes may enter faulty states without crashing and existing supervision solutions cannot detect these cases.

Existing well-known cloud monitoring solutions typically operate on a few seconds scale. Some monitoring solutions can test the health of the application. Typical techniques involve initiating remote network connections, which cannot be carried out every few milliseconds due to the networking overhead. Also, it may be possible to open a network connection towards an application even though the main component is in faulty state.

Existing solutions either provide instant restart of the faulty applications or raise alarms in central systems. In latency critical systems communication with central entities may unexpectedly delay the required corrective action, and these may not be as simple as restarting the application, but some configuration change or a fail over to a hot standby instance.

Accordingly, a need exists to further improve the detection of faults in an application running in a cloud environment, especially when a short reaction time is needed.

SUMMARY

This need is met by the features of the independent claims. Further aspects are described in the dependent claims.

A method for checking a correct operation of an application running in a cloud environment is provided wherein a health checking entity monitors a reception of health reports generated by the application and wherein each health report comprises at least information allowing an operation status of the application to be determined. Furthermore, it is determined whether an anomaly is detected in the reception of the health reports. When an anomaly is detected in the reception a transmission of a new health report to be transmitted by the application is triggered and it is determined whether the application is operating correctly after triggering the transmission of the new health report. If the application is not operating correctly after triggering the transmission of the new health report, a control entity of the application is informed that the application is not operating correctly.

The above described method provides the possibility for a fast failure detection and enables application specific recovery mechanisms for applications running in a cloud execution environment. The method mainly relies on a passive tracking of the reception of health reports and only when an anomaly is detected in these receptions an active monitoring of the application and an active checking whether the application is running correctly is carried out. This allows a low latency failure detection with low overhead.

The health checking entity and the application may be located on the same node, however, it is also possible that the health checking entity and application are located on different nodes of the cloud environment.

Furthermore, the corresponding health checking entity configured to check the correct operation of the application running in the cloud environment is provided, wherein the health checking entity comprises a memory and at least one processing unit wherein the memory comprises instructions executable by the at least one processing unit and wherein the health checking entity is operative to work as mentioned above or as discussed in more detail below.

Alternatively, a health checking entity is provided configured to check the correct operation of the application running in a cloud environment wherein the health checking entity comprises a first module configured to monitor a reception of health reports generated by the application wherein each health report comprises at least information allowing an operation status of the application to be determined. The health checking entity comprises a second module configured to determine whether an anomaly is detected in the reception of the health reports. Furthermore, a third module is provided which, when an anomaly is detected in the reception of the health reports triggers a transmission of a new health report to be transmitted by the application. A fourth module is provided configured to determine whether the application is operating correctly after triggering the transmission of the new health report. If the application is still not operating correctly after triggering the transmission of the new health report, a fifth module can be provided which informs a control entity of the application that the application is not operating correctly. Furthermore, a method is provided for checking a correct operation of a first node located in a cloud environment comprising a plurality of nodes. Here a health checking entity located on a second node of the plurality of nodes monitors a reception of data traffic generated by the first node and which is received at the second node. Furthermore, it is determined whether an anomaly is detected in the reception of the data traffic. If this is the case, a transmission of a status report to the first node is triggered and it is determined whether the first node is operating correctly after triggering the transmission of the status report based on a possible answer received from the first node in response to the transmitted status report. When the possible answer indicates that the first node is not operating correctly a control entity of the second node is informed.

Furthermore, the corresponding health checking entity is provided which is located on the second node of the cloud environment and which checks the correct operation of the first node wherein the health checking entity comprises a memory and at least one processing unit wherein the memory comprises instructions executable by the at least one processing unit and wherein the health checking entity is operative to operate as discussed above or as discussed in further detail below.

As an alternative a health checking entity is provided located on the second node of the cloud environment comprising the plurality of nodes which is configured to check the correct operation of the first node located in the cloud environment wherein the health checking entity comprises a first module configured to monitor a reception of data traffic generated by the first node. A second module is provided configured to determine whether an anomaly is detected in the reception of the data traffic. When an anomaly is detected in the reception, a third module is provided and is configured to trigger a transmission of a status report to the first node. A fourth module determines whether the first node is operating correctly after triggering the transmission of the status report based on a possible answer received from the first node in response to the transmitted status report. A fourth module of the health checking is configured to inform a control entity of the second node when the answer to the status report indicates that the first node is not operating correctly.

In this example the operation of an entire node in the cloud environment can be monitored. Based on the status report and the possible answer such as if an answer received at all, the health checking entity can track the network activity from other nodes in the cloud environment. Again the basis for the determination is the passive monitoring of the data transfers between the nodes or between the applications provided on both the nodes.

Furthermore, a computer program comprising program code to be executed by at least one processing unit of the health checking entity is provided wherein execution of the program code causes the at least one processing unit to execute a method as discussed above or as discussed in further detail below. Additionally, a carrier comprising the computer program is provided wherein the carrier is one of an electronic signal, optical signal, radio signal or a computer readable storage medium.

It is to be understood that the features mentioned above and features yet to be explained below can be used not only in the respective combinations indicated but also in other combinations or in isolation without departing from the scope of the present invention. Features of the above-mentioned aspects and embodiments may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

FIG. 6 shows a further example flowchart of a method carried out by the health checking entity for determining the correct operation of an application.

FIG. 7 shows an example flowchart of a method carried out by a health checking entity for checking the correct operation another node or an application located on another node.

FIG. 8 shows another example schematic representation of the health checking entity configured to determine the correct operation of an application in a cloud environment.

FIG. 9 shows a still further example schematic representation of another health checking entity configured to determine the correct operation of an application in a cloud environment.

DETAILED DESCRIPTION

Figure 1:
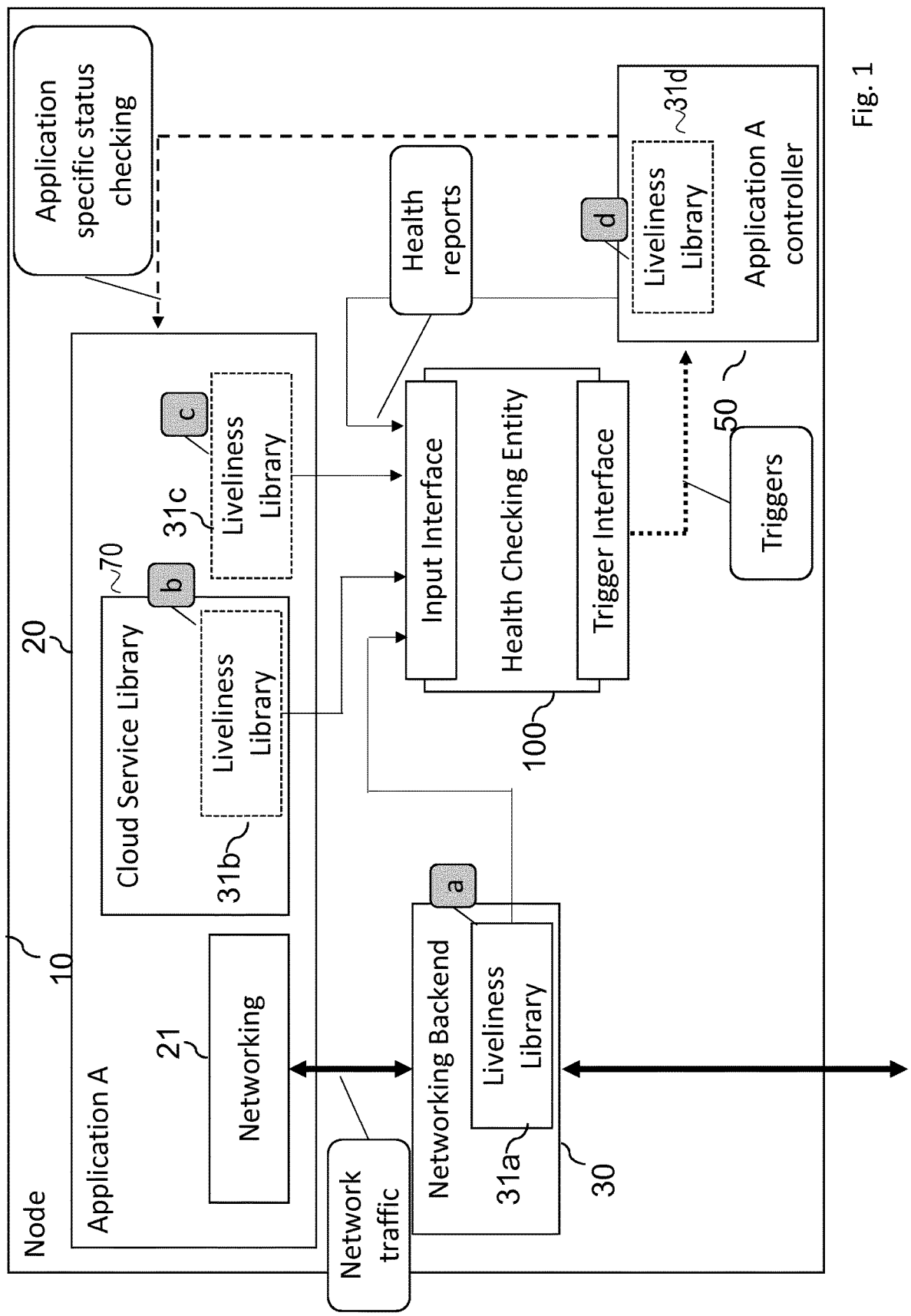
FIG. 1 shows a schematic architectural overview of a node in a cloud environment in which a health checking entity monitors a correct functioning of an application.

In the following embodiments of the invention will be described in detail with reference to the accompanying drawings. It is to be understood that the following description of embodiments is not to be taken in a limiting sense. The scope of the invention is not intended to be limited by the embodiments described hereinafter or by the drawings which are to be illustrative only.

The drawings are to be regarded as being schematic presentations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

In the following, a solution is explained which provides a fast failure detection and enables application specific recovery mechanisms for applications running in a cloud execution environment. One example of such an application is an Internet of Things (IoT) system which is controlled by the application, e.g. the controlling of a robot or similar devices by providing commands to the robot. As an alternative the application may be a telecommunication related application such as packet inspection or any other service provided to a user in a telecommunications environment. While the solution discussed below can serve general cloud applications such as web services, it is mostly beneficial for critical, latency sensitive systems, by way of example critical machine type communication (C-MTC). The solution discussed below primarily relies on passive activity tracking of the applications and triggers active monitoring on demand, thus making low latency failure detection possible for a low overhead.

An application running in the cloud either uses some cloud platform service or networking to interact with other systems. The solution discussed below defines a reporting method that gives liveliness i.e. whether it operates correctly information to a node local monitoring component, which is called health checking entity hereinafter. The reporting method automatically provides liveliness information based on the application activity, but the application may provide additional input as well. Furthermore, it is possible to collect liveliness information for other nodes based on the same principle.

If the local monitoring component in the form of the health checking entity detects changes in the liveliness information such as a missing input for a predefined automatically learned period of time, it notifies a node local control entity. The control entity can then apply active, application specific monitoring or can send Keepalive messages in case of remote nodes. If the active monitoring is not capable of providing a liveliness information, the control entity can pursue custom corrective actions such as failover or restart.

In the following an embodiment will be discussed with a monitoring of an application located on the same node as the health checking entity. The following sections describe a system and a method for combining passive and active monitoring of applications running on a node to provide a fast failure detection.

Applications running in a cloud environment either use a cloud platform service or networking to interact with other systems. The solution discussed below provides a reporting method which can be embedded into all cloud interfaces and the backend networking driver and automatically provides health reports about the given application for a node local health checking entity. In this way the cloud platform can passively monitor the liveliness of applications, possibly with high frequency in case of highly interactive applications.

FIG. 1 shows a node 10 executing an application A and named with reference numeral 20. Any type of virtualization may be used in the system: by way of example application A can be a process, a container or a virtual machine. The reporting method is realized by a liveliness library 31 wherein different locations of the liveliness library 31a to 31d are shown in FIG. 1. The liveliness library sends health reports about the application 20 to a node local health checking entity 100, here especially to its input interface.

The purpose of the liveliness library 31 is to form the health reports using a format or protocol required by the health checking entity 100 in a concrete implementation. Furthermore, the liveliness library 31 establishes the connection and sends the reports to the health checking entity using the communication technology of an implementation, by way of example a shared memory communication.

The health report should identify the application instance, and thus provides a liveliness input for the health checking entity 100. The reports can contain other application specific or user defined information as well.

FIG. 1 shows different places where the liveliness library 31 can be located. First of all it may be embedded into the network backend 30, by way of example a virtual switch, a LINUX network stack wherein this position is indicated as a in the Figure wherein the liveliness library 31a sends a health report when application A sends one or more network packets. The liveliness library may also be embedded into cloud service libraries, such as databases, storage, image processing, marked with b in the Figure wherein the liveliness library 31b is provided in the cloud service library 70. The library 31b can sent health reports when application A uses the given service thus a passive monitoring of the application is provided. In another embodiment it can be also beneficial for an application to directly provide information about its health so that is possible by using liveliness library 31c, which is located directly in the application. The functionality of the liveliness library may be implemented in the application itself, although it may be beneficial to use the library 70 for this purpose.

This active kind of monitoring may be needed for extremely latency sensitive applications such as industrial IoT, where the application may be required to respond in a few milliseconds to inputs which can arrive any time. In this case the detecting that such application has failed only when the critical input arrives, may be too late. When the application uses the reporting method discussed below to provide frequent health reports, even when there is no input to process, failures can be detected earlier.

The health checking entity keeps records and tracks each locally running application through the health reports. Furthermore, an application specific control entity such as controller 50 in FIG. 1 should be provided which can receive triggers from the health checking entity. The triggers are sent if the health checking entity 100 detects anomalies in the provided health reports or if the reports are simply missing.

The health checking entity can use two different types of triggers:

Probe Triggers and Failure Triggers. Each of the triggers identifies the application instance and provides status information such as that the application A has not provided any health information for a certain time period such as 10 ms. A Probe Trigger is sent when the passive monitoring does not provide sufficient information on the application instance and it initiates the active monitoring of the application. The controller 50 may use any custom method to communicate with the given application instance and check its status or modify its configuration, by way of example using a custom application program interface, API, open a network connection or examine log outputs of the application. It can sent a health report to the health checking entity using the liveliness library such as liveliness library 31d located at position d as shown in FIG. 1.

If the health checking entity does not get health reports even after triggering the active monitoring, it sends a Failure Trigger to the control entity 50. It is possible that the health checking entity 100 sends multiple Probe Triggers before sending a Failure Trigger. The exact behavior of the control entity 50 in this scenario is application dependent. By way of example, the controller may trigger a failover of the faulty application to another identical instance of the application or it may retrieve states from the faulty application, restart it and load back the states.

If the application does not provide an application specific control entity 50, the system may use a generic control entity that is capable to carry out a basic status checking such as a check whether the application 20 is running or not and actions such as restarting the application 20 in case of a failure. This generic control entity may be implemented as part of the health checking entity 100. As the health reports and the triggers are sent inside a node, a low overhead communication method is provided and an implementation such as shared memory communication may be used.

Figure 2:
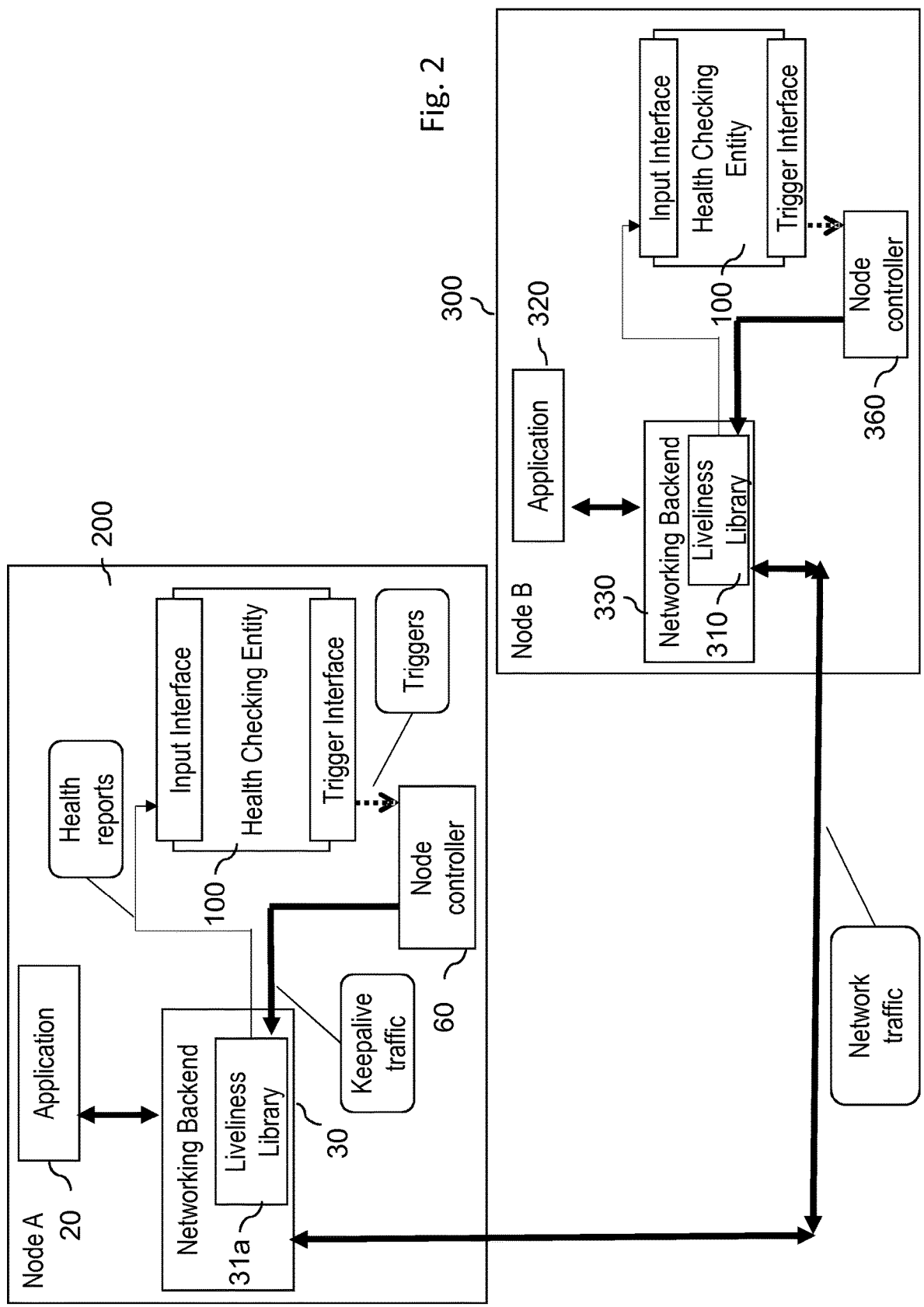
FIG. 2 shows a further schematic overview over a system in which a health checking module monitors the correct operation of an application located on another note and thus monitors the correct operation of the other node.

In connection with FIG. 2, an embodiment will be discussed in which the liveliness or correct operation of entire nodes in the system is monitored. As shown in FIG. 2, a first node 200 of the cloud environment can monitor the correct operation of node 300 or vice versa node 300 can monitor the correct operation of node 200 or of the application 20 located on node 200. Based on the health reports from the liveliness library such as library 31a or 310 embedded into the networking backend 30 and 330, respectively, the health checking entity 100 can track the networking activity from other nodes in the cloud environment. The basis of the correct operation is the passive monitoring of communication between the applications running on the nodes, here the communication between application 20 and the application 320. The health checking entities 100 provided in both nodes 200 and 300 apply algorithms or principles for the node related health report as will be discussed further below.

As shown in FIG. 2, each node runs a node controller 60, 360 which serve similar purposes as the application specific controllers 50 described in connection with FIG. 1. When a node controller receives a Probe Trigger from the health checking entity 100 the trigger identifies the node which did not provide enough traffic and the corresponding controller 60 or 360 applies active monitoring by sending a status report, e.g. Keepalive packets to the given node. The nodes reply to the Keepalive packets and these replies will generate the health report. Accordingly, the health checking entity 100 located in node 200 will generate a health report for node 300 accordingly this means that the health report generated by the liveliness library 31a generates the health report for node 300 and the liveliness library 310 generates the health report for node 200. If a node does not respond to the active monitoring (i.e. the sending of a status report) and the Keepalive packets the health checking entity sends a trigger to the node controller located on the same node as the health checking entity as indicated by the dashed arrows in FIG. 2. The corresponding node controller 60, 360 can then react accordingly taking countermeasures such as notify a central orchestration entity about the node failure or may send Failure Triggers to application specific controllers which had application instances on the failed node.

Figure 3:
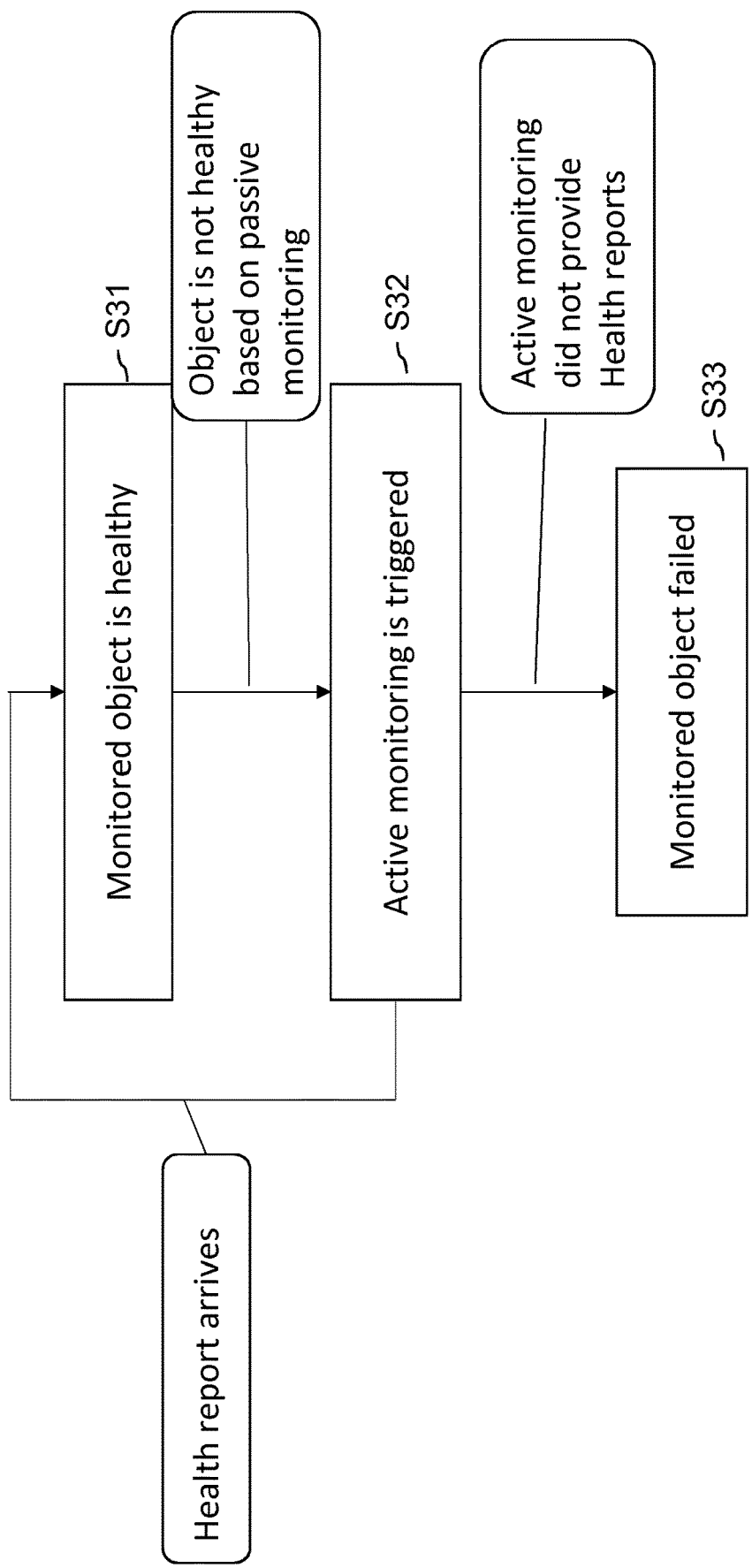
FIG. 3 shows an example schematic representation of the possible operating states and state transitions of the health checking entity shown in FIGS. 1 and 2.
Figure 4:
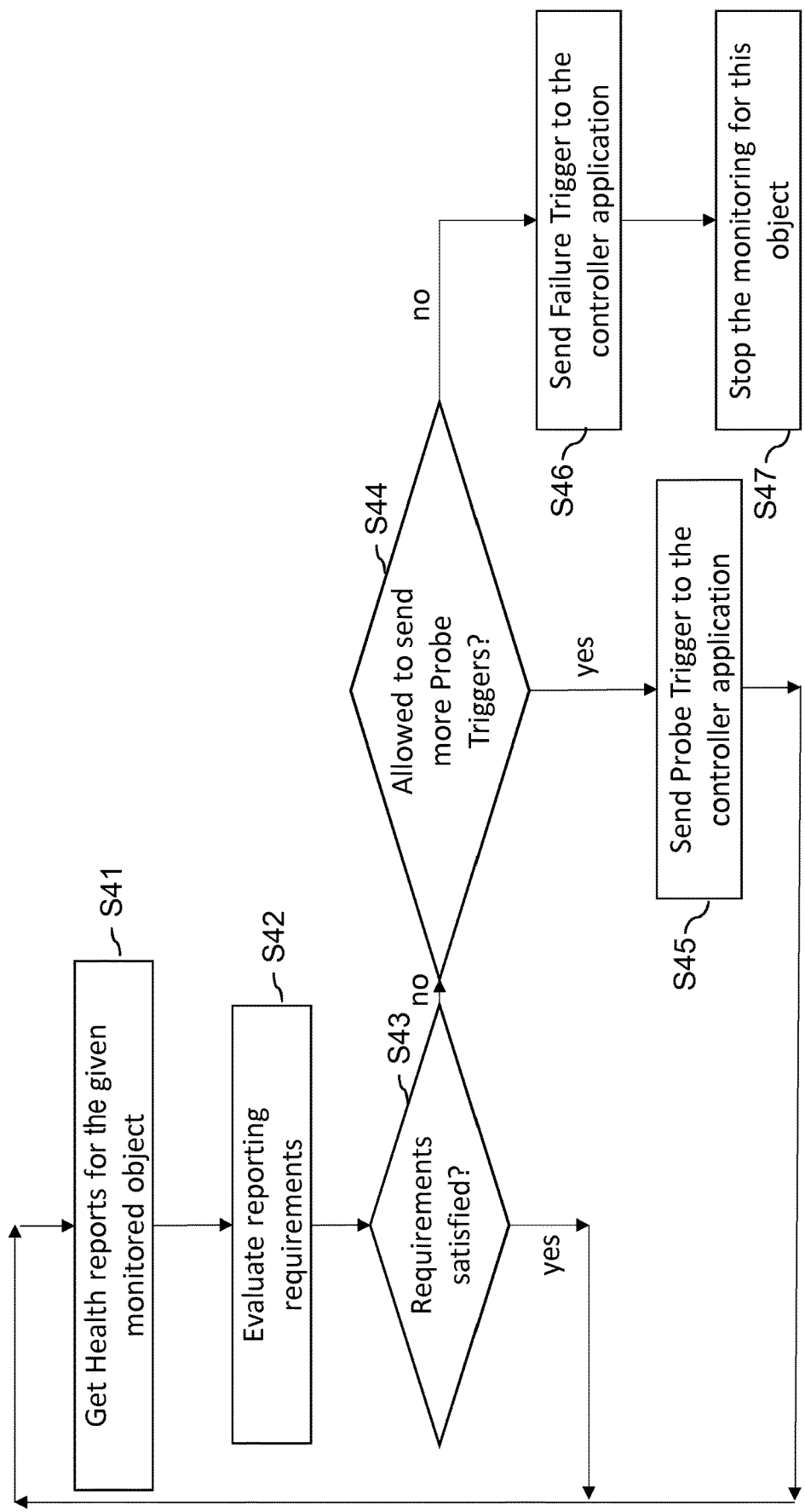
FIG. 4 shows an example flowchart of a method carried out at the health checking entity when monitoring the correct functioning of an application.

In the following the operating of the health checking entity 100 is discussed in more detail. The health checking entity processes the health reports received from the local liveliness library instances or the health reports indicating the correct operation of remote nodes provided by the networking backend in FIG. 2. FIG. 3 shows the possible states and state transitions wherein FIG. 4 shows a flowchart for each monitored object, i.e., the application instance or the node itself. The health checking entity 100 considers the received health reports and as shown in FIG. 3, the object is considered healthy in S31 as long as the passive monitoring provides enough liveliness information satisfying the application or node specific requirements. If the requirements are not satisfied anymore, the health checking entity 100 sends one or more Probe Triggers to trigger the active monitoring in S32 for the given object. If the health reports arrive after sending the Probe Triggers and they again meet the application or node specific requirements, the application or node is considered as healthy again. If the health reports for the application or the node do not arrive at all after triggering the active monitoring or if the content of the received health report does not correspond to the application or node specific requirements, the object is considered as failed in S33 and a Failure Trigger may be sent to the responsible control entity.

FIG. 4 shows a procedure carried out in the health checking entity. In step S41 the health checking entity receives the health reports for the monitored object and in step S42 it evaluates the reporting requirements. These requirements can include requirements such as the receiving of a health report regularly in a certain time interval which can be in the range of milliseconds. The requirement can furthermore include the processing of the content of the health report such as is a predefined error indicator formed in the message or is a predefined indication missing in the message.

In step S43 it is checked whether the requirements are met. In step S44 it is then asked whether more Probe Triggers can be sent. If no Probe Trigger was sent that all, the health checking entity will send a Probe Trigger so that a transmission of a new health reporter is triggered by the health checking entity in step S45. The system then returns to step S41 and if the new health report does not satisfy the requirements in step S43 after having been evaluated in step S42, it is checked in step S44 again whether a transmission of a new health report has to be triggered again or whether, in the negative, a Failure Trigger is sent in step S46 to the control entity of the application or of the complete node. In step S47 the health checking entity then stops the monitoring of the corresponding application or node. The monitoring can also be resumed after a certain time interval or after the information is received that the application is running correctly again.

For the evaluation of the reporting requirements in step S42, certain timeouts may be used, by way of example if the health report is received within a time range of 1, 5, 10, 20 or 50 ms. Especially when the health checking entity is local to the application such as position c shown in FIG. 1, the time range of the monitoring even below 1 ms.

Other possible implementations of the health checking entity can involve more advanced algorithms, making it possible to recognize unusual patterns and not only missing health reports. By way of example, the health checking entity may use an application specific model which may be provided or built on the fly by the health checking entity using machine learning methods.

Figure 5:
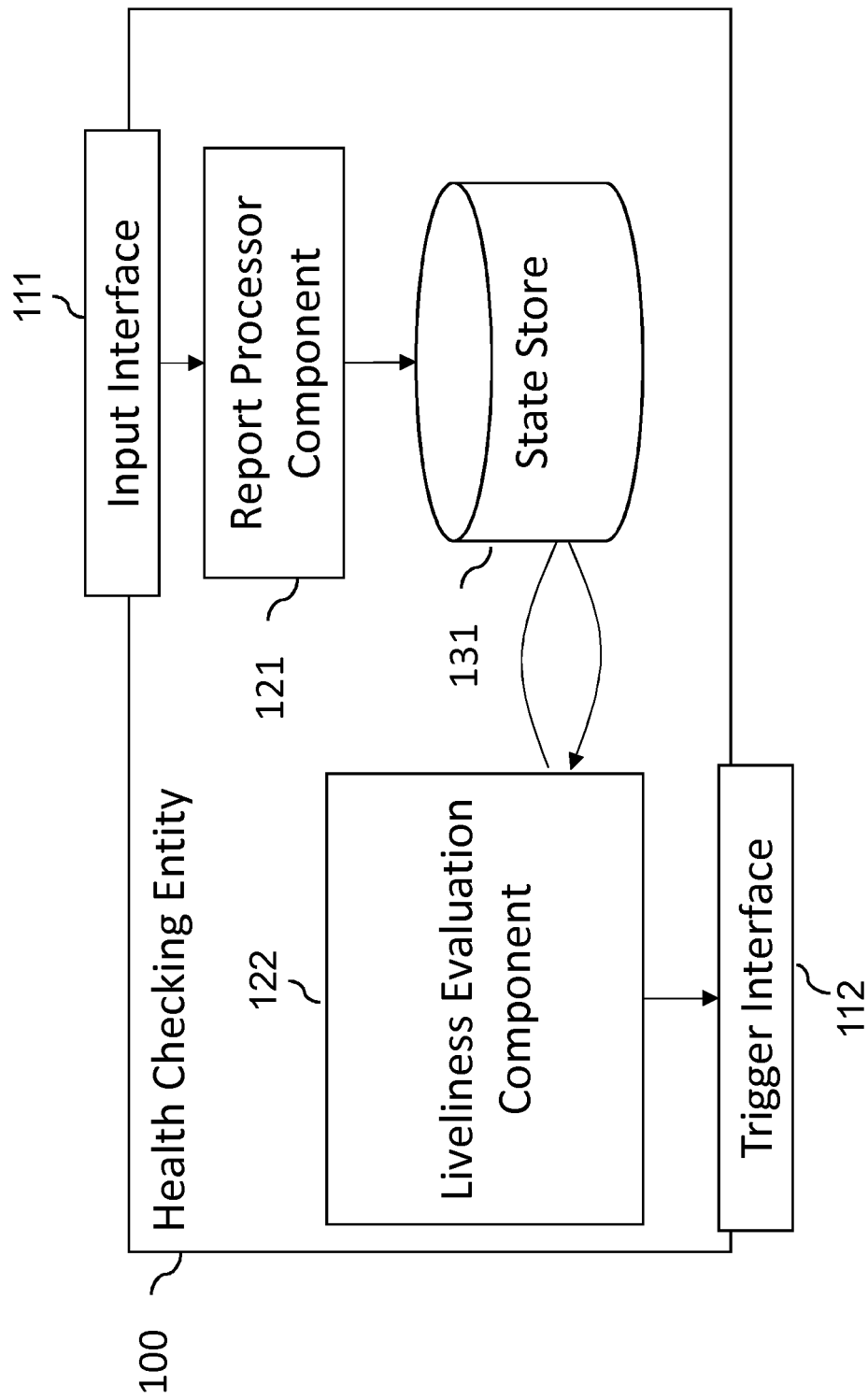
FIG. 5 shows a first schematic representation of a health checking entity checking the correct operation of an application or of a complete node where the application is located.

FIG. 5 shows the health checking entity and the functional entities used at the operation as discussed above. An input interface 111 is used receiving the health reports. A processor component 121 processing the reception of the reports 121 checks whether the predefined requirements of the health reports are met and in a state store 131 essentially two different kinds of information are stored: the state related to the monitored object and the configuration for the monitored object types (i.e. configured parameters for the detection algorithm and the registered responsible controller for the corresponding application). The configuration parameters include the inter-check timeout corresponding to the maximum time between two health reports from a monitored object and a maximum failure count which defines after how many missing health reports the monitored object is considered as failed. Based on the information in the state store 131 a processing component or evaluation component 122 checks the liveliness or the correct operation of the monitored object and if it is determined that the monitored object is not operating correctly the transmission of a new health report is triggered for the application or the transmission of a status report for the node is sent by trigger interface 112.

An example implementation for the health checking entity is indicated below:

```
// State Store keeps the following relational data:
{
    P := map of monitored-object → (last-seen timestamp,
    failure count) tuples
    C := map of object-type → (inter-check timeout, maximum
    failure count, controller) tuples
    // monitored-object is either a peer node or a local app instance
    // object-type is either "node", or any of "App_A", "App_B", ...
```

```
    // controller is the Node Controller or the per-application
    type App Controller
    // Timestamps are measured as time elapsed since some
    commonly understood zero point, e.g., the Unix Epoch.
}
// Health check configuration map C is populated by the
App Controller when starting new
app types, and the Node Controller for nodes. Typically,
timeout for peer nodes is one or more orders of magnitude higher than
timeouts for local application instances.
```

The health reports entering the health checking entity 100 go through the report processor component 121 which updates the states related to the given monitored object in the state store.

```
// on receiving a Health Report update timestamp & clear failure count
obj ← GetMonitoredObjectFrom(report)
P[obj] ← (CurrentTimestamp( ), 0)
```

The failure detection algorithm runs in the Liveliness Evaluation Component 122 in an infinite loop and it uses the P and C mappings from the State Store component. The algorithm checks for each monitored object if it has provided a Health report in the application specific timeout period. If not, it sends Probe Triggers to the responsible controller instance, thus triggering active monitoring. If no Health reports arrive after triggering active monitoring, the algorithm considers the monitored object as failed and send a Failure Trigger to the responsible controller.

```
// a loop in Liveliness Evaluation Component checks object timeouts
periodically loop forever
    sleep for minimum-of(inter-check-timeouts in C)
    for obj in P
        configuration ← get C[type of obj]
        if P[obj].last-seen < CurrentTimestamp( ) - configuration.timeout
            P[obj].fail-count += 1
            if P[obj].fail-count < configuration.max-fail-count
                trigger configuration.controller.Probe(obj)
            else
                remove obj from P
                trigger configuration.controller.Failure(obj)
```

FIG. 6 summarizes some of the steps carried out by a health checking entity 100 checking the correct operation of an application located on the same node as the health checking entity. In step S61 the health checking entity monitors the reception of the health reports and in step S62 it is checked whether an anomaly is detected in the reception of the health reports. If this is the case the health checking entity triggers the transmission of a new health report in step S63 and determines in step S64 whether the correct operation is determined after active triggering the transmission of the health report. If the health report is received again or if the content of the health report satisfies the predefined requirements the method returns to step S61. If however it is determined in step S64 that no health report is received at all or whether the content of the health report indicates that there is a failure in the application a control entity is informed in step S65.

FIG. 7 summarizes some of the steps carried out by a health checking entity 100 monitoring the correct operation of another node. In step S71 the health checking entity monitors the reception of the data traffic received from the other node. This can relate to any traffic from the other node or only to traffic received from the application of the same type located on the other node. In step S72 it is asked whether an anomaly is detected in the monitored reception. By way of example this can mean that no traffic is received at all from the node, no traffic is received from the application on the other node, or the traffic from the application is below a defined threshold. If the anomaly is detected in step S72, a transmission of a status report is triggered which is transmitted to the node from which the data traffic reception is monitored (S73). In step S74 a possible answer in response to the transmitted status report is evaluated. In the example mentioned above, the status report was a Keepalive packet sent to the other node and the response to the Keepalive packets is evaluated. Based on the answer, if an answer is received or if no answers is received or how the content of the answer is, it is determined in step S74, whether the other node operates correctly. For a Keepalive packet the existence of a response itself signals that the other node is still operating. However, the response may contain other information from the other node which can be used to make more complex decisions. In case of a correct operation the method returns to step S71 whereas if it is determined in step S74 that the operation is not correct, the control entity is informed accordingly in step S75.

FIG. 8 shows a further schematic architectural view of the health checking entity 100 which is configured to operate as discussed above. The entity 100 comprises an interface 110 which is used for transmitting user data or control messages to other entities wherein the interface 110 can comprise the input interface and trigger interface shown in FIG. 1, 2 or 5. The interface is furthermore configured to receive user data or control messages such as the health reporting from other entities. The health checking entity 100 furthermore comprises a processing unit 120 which is responsible for the operation of the entity 100. The processing unit 120 can comprise one or more processors and can carry out instructions stored on a memory 130, wherein the memory may include a read-only memory, a random access memory, a mass storage, a hard disk or the like. The memory 130 can furthermore include a suitable program code to be executed by the processing unit 120 so as to implement the above described functionalities in which the health checking entity 100 is involved. The processing unit 120 can include the report processor component 121 and the liveliness evaluation component 122 shown in FIG. 5 which are functional parts of the processing unit 120.

FIG. 9 shows a further architectural view of a health checking entity 300 which comprises a first module 310 for monitoring the reception of the health reports. Furthermore, a module 320 is provided for determining an anomaly in the received health reports. If the module 320 detects that there is an anomaly in the detected health reports a module 330 is provided and configured to trigger the transmission of a new health report. If after the triggering of the transmission of the new health report module 320 still determines that there is an anomaly in the detected health reports, a module 340 informs a control entity that the application is not operating correctly.

Figure 10:
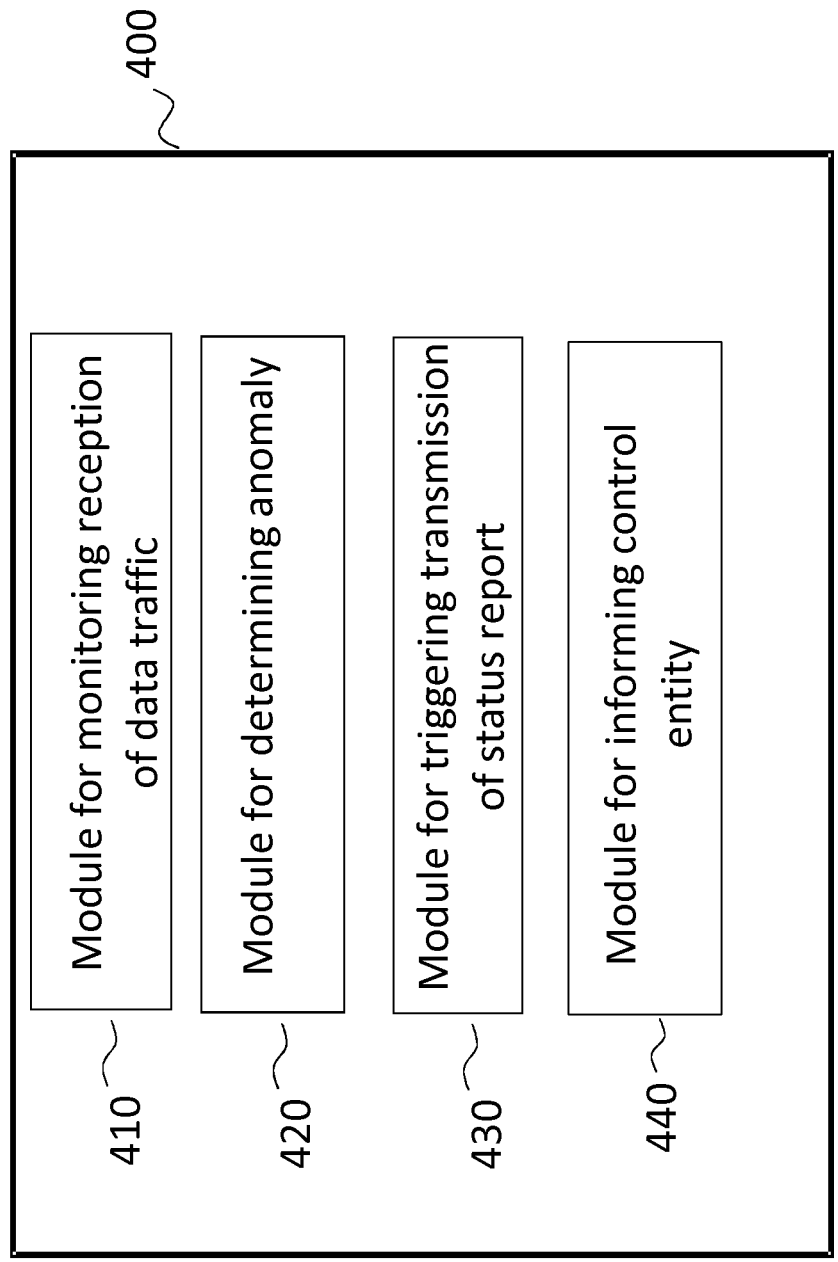
FIG. 10 shows another example schematic representation of a health checking entity configured to determine the correct operation of another node or an application on another node in a cloud environment.

FIG. 10 shows a further architectural view of a health checking entity configured to monitor the correct operation of other nodes located in the cloud environment. The health checking entity 400 comprises a first module 410 for monitoring the reception of data traffic from the other node. A module 420 is provided for determining an anomaly in the detected reception of the data traffic such as that no traffic is received at all of the received traffic is below a certain threshold. A module 430 is provided for triggering the transmission of a status report if module 420 determines that the other node is not operating correctly. The module for determining the anomaly 420 can then check and process the answer received from the other node in response to the transmitted status report and if it is still determined that the other node is not operating correctly a module 440 may inform the control entity on the own note that the other node is not operating correctly.

From the above discussion some general conclusions can be drawn.

As far as the monitoring of an application running the same node is concerned, the step of informing the control entity of the application that the application is not operating correctly can include the steps of transmitting a trigger message, the failure trigger mentioned above by which the control entity is triggered to overcome the incorrect operation of the application.

For the detection of the anomaly it can be determined whether any health report is received at all within a predefined time range wherein when no health reporter is received over the predefined time range, the transmission of the new health report is triggered.

Furthermore, the anomaly in the reception of the health report can be detected by checking a content of the health report and the transmission of the new health report is triggered when the content of the health report as received does not correspond to predefined content or when the content of the health report comprises a predefined error information.

Furthermore, it is possible that the triggering of the transmission of a new health report, the Probe Trigger as mentioned above is carried out several times before the transmission of the new health report is triggered. This was discussed above in connection with FIG. 4 in step S44 and S45.

The determination whether the application is operating correctly can comprise the step of determining whether the anomaly is still detected after a defined time period after having triggered the transmission of the new health report. If it is determined that the application is not operating correctly when the anomaly is still detected after having triggered the transmission of the new health report and after the defined time period has lapsed, the control entity can be informed about the fact that the monitored application is not operating correctly.

Preferably, the application is running on the same node of the cloud environment as the health checking entity. However, it should be understood that is also possible that the application and the health checking entity are operating on different nodes of the cloud environment. In this example it is not necessarily the case that the operation of the whole node is monitored as discussed above in connection with FIG. 2, but it is possible to monitor the operation of an application located in another node. The anomaly may be detected if no health report is received in a time interval which can be between 10 to 20 ms or 20 to 50 ms or even lower, between 5 and 15 ms.

As far as the checking of the correct operation of a first node is concerned, the anomaly may be detected in the reception of the data traffic when the traffic as received from the first node is smaller than a predefined traffic volume including the reception of no traffic at all.

For determining whether the first node is operating correctly it can be determined whether the anomaly is still detected in a defined time period after having triggered the transmission of the status report wherein it is determined that the first node is not operating correctly when the anomaly is still detected after having triggered the transmission of the status report and after the defined time period has lapsed.

For determining whether an anomaly is detected the health checking entity 100 can determine whether any data traffic is received at all from the first node, wherein when no data traffic is received over a predefined time range after triggering the transmission of the status report, it is determined that the first node is not operating correctly.

Summarizing, the above discussed solution combines passive and active monitoring in a cloud environment. The method utilizes the application generated activity and the networking traffic as indicators whether the node or application is running correctly and triggers an active monitoring with the triggering of a new status report and the sending of Keepalive messages to the remote nodes, only when the natural activities do not provide enough liveliness information. Accordingly, the proposed method minimizes the overhead caused by active monitoring. The usage of node local components as the health checking entity and application specific controller are provided on the same node, enables low latency failure detection and custom recovery actions with very low latency. The above discussed solution can detect application failures and not only crashes within a node in the millisecond range, furthermore passive and active monitoring are adaptively combined for the detection. The method furthermore allows complex corrective actions and not only a restart using node local components only so that a fast reaction is ensured. Furthermore, the network traffic overhead is minimized by using application generated traffic as an indicator of the liveliness wherein, extra Keepalive traffic is adaptively inserted.

The invention claimed is:

1. A method for checking a correct operation of an application running in a cloud environment, the method comprising at a health checking entity:
   monitoring a reception of health reports generated by the application, each health report comprising at least information allowing an operation status of the application to be determined;
   determining, in a passive monitoring, whether an anomaly is detected in the reception of the health reports;
   responsive to an anomaly being detected in the reception, initiating change in the monitoring from the passive monitoring to active monitoring and triggering a transmission of a new health report, during the active monitoring, to be transmitted by the application;
   determining whether the application is operating correctly after triggering the transmission of the new health report, wherein determining whether the application is operating correctly comprises determining whether the new health report is received, whether the new health report satisfies a predefined requirement, whether an answer is received in the new health report, based on the contents of the answer in the new health report, or whether the anomaly is still detected in a defined time period; and
   wherein, if the application is not operating correctly after triggering the transmission of the new health report, informing a control entity of the application that the application is not operating correctly.

2. The method according to claim 1, wherein informing a control entity comprises transmitting a trigger message to the control entity by which the control entity is triggered to overcome an incorrect operation of the application.

3. The method according to claim 1, wherein determining whether an anomaly is detected in the reception of the health reports comprises determining whether any health report is received at all, wherein when no health report is received over a predefined time range, the transmission of the new health report is triggered.

4. The method according to claim 1, wherein determining whether an anomaly is detected in the reception of the health reports comprises checking a content of the health report wherein the transmission of the new health report is triggered when the content of the health report does not correspond to a predefined content or when the content of the health report comprises a predefined error information.

5. The method according to claim 1, wherein the control entity is only informed about an incorrect operation when the transmission of a new health report is triggered for a predefined number of times.

6. The method according to claim 1, wherein determining whether the application is operating correctly comprises determining whether the anomaly is still detected in a defined time period after having triggered the transmission of the new health report, wherein it is determined that the application is not operating correctly when the anomaly is still detected after having triggered the transmission of the new health report and after the defined time period has lapsed.

7. The method according to claim 1, wherein the application and the health checking entity are running on the same node of the cloud environment.

8. The method according to claim 1, wherein the application and the health checking entity are operating on different nodes of the cloud environment.

9. The method according to claim 1, wherein determining whether the anomaly is detected in the reception of the heath reports in a time range is repeated in a time interval between 10 to 20 ms, preferably between 5 and 15 ms.

10. The method according to claim 1, wherein the passive monitoring comprises receiving health reports without transmitting any probe triggers for the health reports, and the active monitoring comprises transmitting a probe trigger or a failure trigger to trigger transmission of the new health report.

11. A method for checking a correct operation of a first node located in a cloud environment comprising a plurality of nodes, the method comprising at a health checking entity located on a second node of the plurality of nodes:
   monitoring a reception of data traffic generated by the first node and received by the second node;
   determining, in a passive monitoring, whether an anomaly is detected in the reception of the data traffic;
   responsive to an anomaly being detected in the reception, initiating a change in the monitoring from the passive monitoring to active monitoring and triggering a transmission of a status report to the first node during the active monitoring;
   determining whether the first node is operating correctly after triggering the transmission of the status report based on a possible answer received from the first node in response to the transmitted status report; and
   wherein, if the node is not operating correctly after triggering the transmission of the status report, informing a control entity of the second node when the possible answer indicates that the first node is not operating correctly.

12. The method according to claim 11, wherein the anomaly is detected in the reception of the data traffic when the data traffic received from the first node is smaller than a predefined traffic volume.

13. The method according to claim 11, wherein determining whether the first node is operating correctly comprises determining whether the anomaly is still detected in a defined time period after having triggered the transmission of the status report wherein it is determined that the first node is not operating correctly when the anomaly is still detected after having triggered the transmission of the status report and after the defined time period has lapsed.

14. The method according to claim 12, wherein determining whether an anomaly is detected in the reception of the data traffic comprises determining whether any data traffic is received at all from the first node, wherein when no data traffic is received over a predefined time range after triggering the transmission of the status report, it is determined that the first node is not operating correctly.

15. A health checking entity configured to check a correct operation of an application running in a cloud environment, the health checking entity comprising a memory and at least one processing unit, the memory comprising instructions executable by the at least one processing unit, wherein the health checking entity is operative to:
- monitor a reception of health reports generated by the application, each health report comprising at least information allowing an operation status of the application to be determined;
- determine, in a passive monitoring, whether an anomaly is detected in the reception of the health reports;
- responsive to an anomaly being detected in the reception, initiate change in the monitoring from the passive monitoring to active monitoring and trigger a transmission of a new health report, during the active monitoring, to be transmitted by the application;
- determine whether the application is operating correctly after triggering the transmission of the new health report, wherein determining whether the application is operating correctly comprises determining whether the new health report is received, whether the new health report satisfies a predefined requirement, whether an answer is received in the new health report, based on the contents of the answer in the new health report, or whether the anomaly is still detected in a defined time period; and
- wherein if the application is not operating correctly after triggering the transmission of the new health report, inform a control entity of the application that the application is not operating correctly.

16. The health checking entity according to claim 15, further being operative to transmit a trigger message to the control entity by which the control entity is triggered to overcome an incorrect operation of the application when the control entity is informed that the application is not operating correctly.

17. The health checking entity according to claim 15, further being operative, for determining whether an anomaly is detected in the reception of the health reports, to
- determine whether any health report is received at all, wherein when no health report is received over a predefined time range, the health checking entity is operative to trigger the transmission of the new health report.

18. The health checking entity according to claim 15, further being operative, for determining whether an anomaly is detected in the reception of the health reports, to check a content of the health report and to trigger the transmission of the new health report when the content of the health report does not correspond to a predefined content or when the content of the health report comprises a predefined error information.

19. The health checking entity according to claim 15, further being operative to only inform the control entity about an incorrect operation when the transmission of a new health report is triggered for a predefined number of times.

20. The health checking entity according to claim 15, further being operative, for determining whether the application is operating correctly, to determine whether the anomaly is still detected in a defined time period after having triggered the transmission of the new health report, and to determine that the application is not operating correctly when the anomaly is still detected after having triggered the transmission of the new health report and after the defined time period has lapsed.

21. The health checking entity according to claim 15, further being operative to repeat determining whether the anomaly is detected in the reception of the heath reports in a time interval between 10 to 20 ms, preferably between 5 and 15 ms.

* * * * *